Figures 1, 2:
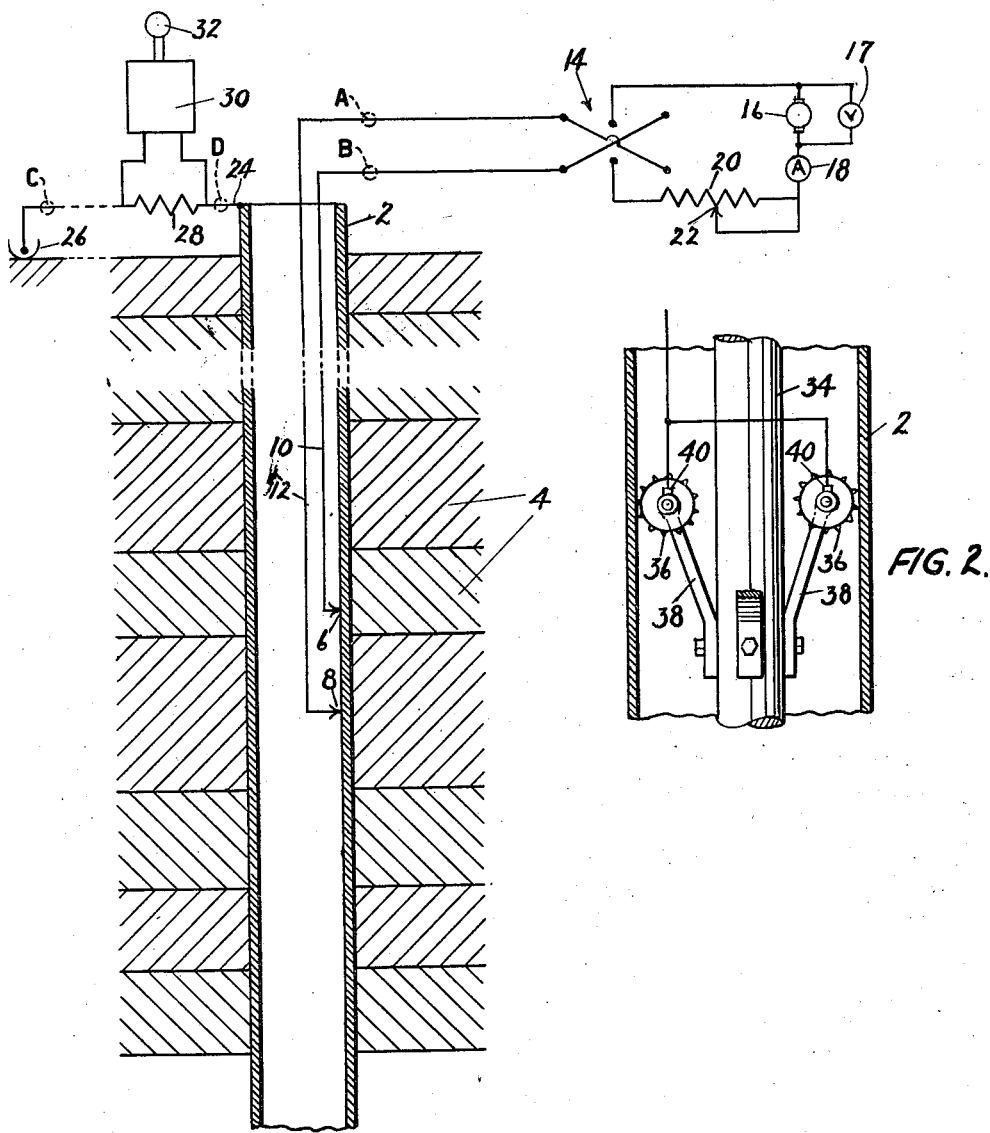

Feb. 26, 1952          J. M. PEARSON          2,587,518

ELECTRICAL LOGGING METHOD AND APPARATUS

Filed Jan. 21, 1949

INVENTOR

John M. Pearson

BY

ATTORNEYS

Patented Feb. 26, 1952

2,587,518

UNITED STATES PATENT OFFICE 2,587,518

ELECTRICAL LOGGING METHOD AND APPARATUS

John M. Pearson, Swarthmore, Pa., assignor to Sun Oil Company, Philadelphia, Pa., a corporation of New Jersey Application January 21, 1949, Serial No. 71,985

4 Claims. (Cl. 175—182)

This invention relates to a method and apparatus for effecting determination of the nature of geological formations penetrated by bore holes.

There have been heretofore proposed various successfully used methods for the electrical logging of bore holes to determine the nature of the strata penetrated thereby. Such logging methods, however, have been confined to the logging of uncased portions of bore holes containing drilling mud or other fluid.

At the present time there exist large numbers of holes which were drilled and cased prior to the use of electrical logging methods; and, particularly when the major source of oil has been exhausted, it becomes desirable to determine whether such holes have passed through strata of minor production possibilities but which should, if possible, be tapped by penetration of the casing at their locations. Additionally, even though a well may have been logged initially, it is sometimes desirable to log it again after a long period of time to determine whether any changes have occurred which might be of interest.

The logging methods applicable to uncased holes are not usable to determine the nature of the strata surrounding a casing, inasmuch as such a casing provides for ordinary logging methods substantially a unipotential surface serving as an impenetrable boundry for the inhomogeneous electrical conditions which are depended upon for logging.

In the patent to William H. Stewart, 2,459,196, dated January 18, 1949, there is proposed a logging method applicable to the logging of cased holes. In this method a heavy current is caused to flow along a casing and an electrode system within the casing is provided to measure the flow of current along the casing at various regions thereof. This flow of current along the casing is directly related to the flow of current from the casing into the surrounding strata, which latter current flow depends upon the nature of the strata and serves for the identification thereof.

The method of said Stewart patent necessitates good metal to metal contact between the exploring electrodes and the casing wall. If such contact is not made, the results are erratic and unreliable inasmuch as electro-chemical potentials arising at metal-liquid interfaces are either substantially greater than, or at least of the order of, the potentials which are to be measured between the exploring electrodes, thus making completely the potentials which are to be measured so that usable results cannot be obtained.

Good metal to metal contact, however, is difficult to obtain inasmuch as the interior of a casing, and particularly of an old casing, is invariably much corroded and generally covered by a hard scale through which even spiked rollers under heavy forces penetrate only with difficulty. Accordingly, while under more favorable conditions, the method of said Stewart patent will produce satisfactory logging, there are various conditions encountered in which metal to metal contact is not achievable and consequently the method fails to give satisfactory reliable results.

It is one object of the present invention to provide a method and apparatus for the logging of cased holes serving to overcome the difficulties encountered with the Stewart method. In brief, this involves the introduction of current to the casing through electrodes moving therein, whereby heavy currents may be used to break down the scale by heating action so as to secure metal to metal contact and sufficiently uniform conditions of operation to enable satisfactory measurements to be made. Other objects of the invention, particularly relating to details of both method and apparatus and the configuration thereof, will become apparent from the following description, read in conjunction with the accompanying drawing, in which:

Figure 1 is a diagrammatic sectional view illustrating the cased portion of a hole and the apparatus associated therewith for logging it; and Figure 2 is a vertical sectional view, partly diagrammatic in nature, indicating the type of apparatus utilized to secure good electrical contact of electrodes with the metal of the casing.

There will first be described the general aspects of the apparatus and the method.

There is indicated at 2 a cased portion of a bore hole through which logging is to be done. This cased portion of the bore hole may be surrounded by strata indicated at 4 of greater or less vertical extent. The strata, in the present case, have been illustrated as having the same order of vertical extent as the electrode spacing to indicate how the apparatus is used to give rise to average rather than fine-grained results. It may be here noted that, as in the case of the Stewart method, the invention is not adapted to detect unerringly the presence of thin strata and, rather, is adapted to the detection of relatively extended regions of high or low resistance strata such as regions of the order of ten to twenty-five feet and upwards.

Electrodes 6 and 8 having a fixed spacing between them are arranged to move along the interior of the casing in metal to metal contact therewith and are electrically connected through the conductors 10 and 12 of a supporting cable to apparatus at the surface including a reversing switch 14 through which current is caused to flow to the electrodes from a generator 16 through an ammeter 18 and a resistor 20, the resistance value of which is adjustable by a contact 22. The generator 16 is preferably a direct current generator such as is used in welding, having a low internal resistance and desirably of such type that its electromotive force is dependent upon its speed which should be variable through rather wide limits. A voltmeter 17 connected across the generator terminals serves to measure its output voltage.

The upper end of the casing 2 is connected through a resistance 28, which may be a high resistance, to a remote ground preferably through a non-polarizing electrode indicated at 26. There may be a plurality of such electrodes to provide, in effect, an extended ground. These may be disposed in such fashion as to minimize disturbing effects of stray ground currents. The resistor 28 has its ends connected to a sensitive amplifier 30 which feeds a galvanometer 32, preferably of recording type, so that the readings of the galvanometer indicate the potential drop across the resistor 28, and, consequently, the current therethrough. The input impedance of the amplifier 30 is preferably high with respect to the resistance 28 though this is not essential if the resistance between the ends of resistance 28 is constant. A vacuum tube voltmeter having an effectively infinite input impedance may be used to measure the potential between the upper end of the casing and the remote ground.

Figure 2 illustrates an electrode arrangement which may be adopted for each of the electrodes 6 and 8. This consists of a supporting bar 34 carrying strong spring members 38, in the outer ends of which there are journalled spiked wheels 36 to which electrical connections are made through brushes to the cable conductors as indicated at 40. Each of the electrodes may be thus constituted, the two electrodes, of course, being insulated from each other by insulation of the supporting bars 34, the assembly being such that the spacing between the electrodes is constant. The springs 38 desirably are very strong so as to force the spikes of the wheels 36 through normally occurring scale on the interior of the casing. Mechanical forces thus exerted may not be sufficient to penetrate some types of scale. However, by utilizing sufficiently high generator voltages and corresponding heavy currents, the scale may be broken down so that good contact is effected. As will be pointed out hereafter, measurements in a particular run, in order to be comparable, should be made under conditions of constant current through ammeter 18. Consequently, it is desirable that the current indicated by the ammeter 18 should be recorded simultaneously with the readings of the galvanometer 32, for example, photographically on the same film or sensitized paper, so that the portions of the galvanometer records which may be validly considered may be ascertained. In the operation of the device, the voltage of the generator indicated at 17 and the resistance at 20 are so manipulated as to maintain constant the current through ammeter 18 regardless of good or poor contacts at 6 and 8. If it is found that the current through the ammeter 18 drops substantially for a given voltage indication at 17 and set value of 20, this means that metal to metal contact may not be occurring at one or both of the electrodes. Under such circumstances, the generator may be speeded up to deliver a higher voltage until an increase in the ammeter reading indicates that the heating or arcing effect of the current has broken down the scale in the casing whereupon the generator voltage may be lowered to its normal value and the operator may proceed with the logging, making adjustments to keep the current constant. The portion of the record which then corresponds to the increase of generator voltage must, of course, be disregarded, the galvanometer giving usable indications only when the current is maintained at a constant value. It may, of course, be here noted that a gradual drift in generator current is not detrimental to the attainment of usable results, if account is taken of the change of current and the galvanometer readings are corrected accordingly. However, galvanometer readings which correspond to such low current flow through the ammeter 18 as would indicate an absence of metal to metal contact should be disregarded. The following description of the theory of operation will readily indicate to those skilled in the art the precautions which should be taken to determine what portions of the galvanometer record are to be used to be interpreted into terms of the nature of the strata, either directly or through suitable calculated corrections.

That the apparatus and operations described above will serve to give an indication of the nature of the strata may not be immediately apparent and, consequently, there will be compared with the apparatus described a hypothetical apparatus the operation of which may be more readily visualized.

A system of the type herein involved, when metal to metal contacts are used and a non-polarizing ground is used, is fundamentally linear, i. e., currents in such a system are linearly related to the potentials applied to the system. Consequently, the reciprocal theorem applies. This theorem states that if A and B are one pair of terminals in a linear network which has any other pair of terminals C and D the change of potential difference between C and D resulting from a given change of current applied to terminals A and B is the same as the change in potential difference between A and B resulting from the same change of current applied to terminals C and D.

In Figure 1 such pairs of terminals A and B, and C and D are indicated as theoretical terminals for the network comprising the leads 10 and 12, contacts 6 and 8, the casing 2, the earth, and the electrode 26. In the arrangement which has been described current is introduced at the terminals A and B and a potential is measured between the terminals C and D. Let it be assumed that the external resistance between C and D is infinite, i. e., very high. According to the reciprocal theorem as stated a current introduced at A and B would produce a potential between C and D which would be the same as the potential between A and B if the same current was introduced at C and D, the external resistance presented at A and B being in the last case also theoretically infinite.

Consider now what would happen if current was introduced at C and D and a potential measured between A and B. The introduced current would flow lengthwise of the casing and pass into the earth to return to the ground electrode 28 so that at the lower end of the casing the current flow along the casing would be zero. The density of the current leaving the casing at any region along its length would depend upon the strata surrounding that region. Consequently, if the electrodes 6 and 8 had their constant spacing as described the change of current flow lengthwise of the casing between the electrodes would depend upon the flow of current from the casing into the earth. If, for example, an extended region of the casing was surrounded by a stratum of high resistance, substantially no current or a relatively small amount of current would flow from the casing and, consequently, the current flowing lengthwise of the casing would remain substantially constant through that region. Accordingly for a constant current input the potential drop between the electrodes 6 and 8 would be substantially constant if the electrodes moved through that region. On the other hand, if a region of the casing was surrounded by a stratum of relatively low resistance the flow of current from the casing would progressively reduce the current flowing lengthwise of the casing; and, consequently, if the electrodes moved downwardly the potential drop between them would decrease progressively through such region. It will be evident, therefore, that the readings of potential between A and B, corresponding to the current flow lengthwise through the casing, could be translated into terms of the flow of current from the casing and, consequently, into terms of the nature of the strata surrounding the casing. If the potential indicated between A and B was plotted as a graph against depth a constant value of current would indicate a region of infinite resistance while lower values of resistance of the strata would be indicated by slopes of the graph, the slope being greater the lower the value of resistance. This would be the operation assuming substantially uniform conductivity of the casing, an assumption which would be generally justified unless the casing was so badly corroded that its wall thickness would vary materially. This also assumes good metal to metal contact at the electrodes 6 and 8 so that electrochemical potentials would not arise which would be greater than the potential drop along the casing between the electrodes.

But as has been indicated the hypothetical system just described will operate, so far as potential-current relationship is involved, identically with the actual arrangement disclosed in which current is introduced at A and B and the potential is measured between C and D. While it is difficult to visualize that a similar graph would result plotted against depth, it will be evident that the reciprocal theorem requires this to be the case. Consequently, just as in the hypothetical situation the potential measured by the meter 32 will indicate the nature of the strata at the various depths of location of the electrodes 6 and 8.

The advantage of the system disclosed over the hypothetical one will be evident due to the fact that heavy currents may be forced through the scale to break down the resistance offered thereby and insure good metal to metal contact. The system does not have the disadvantages of the other one which will fail if good metal to metal contact is not secured. Accordingly, with the taking of precautions as indicated above reliable results may be secured.

Reversing the current flow by means of switch 14 may be sometimes advantageous in that by taking successive readings with reversed current with the electrodes in the same position there may be balanced out the effects of stray earth currents which, whether constant or variable, might otherwise affect the measurements. Likewise, it will be evident that electrochemical potentials and various potentials arising from local action may be thus eliminated from consideration, this being in accord with the superposition theorem which holds for linear systems. Also, the same considerations will make it evident that if background potentials are constant they may be backed out by various battery energized potentiometer arrangements. If reversals are used they must in general be of long period, rapid reversals being barred by the long time constant due to inductance of the earth-casing circuit, this time constant being of the order of one second for 5000 feet of depth.

It will be apparent from the foregoing that numerous modifications of the invention may be adopted without departing from the principles of the invention as defined in the following claims; for instance alternating current may be used instead of direct current.

What I claim and desire to protect by Letters Patent is:

1. Apparatus for determining the location and character of strata penetrated by a bore hole containing a conductive casing comprising a pair of electrodes engaging the interior of the casing at points spaced lengthwise of the casing, means supporting said electrodes for movement within the casing with fixed spacing, lengthwise of the casing, between them, means for introducing current through said electrodes to flow in the casing and the surrounding strata, and means for measuring the potential between the casing and a remote ground.

2. Apparatus for determining the location and character of strata penetrated by a bore hole containing a conductive casing comprising a pair of electrodes engaging the interior of the casing at points spaced lengthwise of the casing, means supporting said electrodes for movement within the casing with fixed spacing, lengthwise of the casing, between them, means for introducing current through said electrodes to flow in the casing and the surrounding strata, and means for measuring the potential between the upper end of the casing and a remote ground.

3. Apparatus for determining the location and character of strata penetrated by a bore hole containing a conductive casing comprising a pair of electrodes engaging the interior of the casing at points spaced lengthwise of the casing, means supporting said electrodes for movement within the casing with fixed spacing, lengthwise of the casing, between them, a variable potential source connected to said electrodes for introducing current through said electrodes to flow in the casing and the surrounding strata, and means for measuring the potential between the casing and a remote ground.

4. The method for determining the location and character of strata penetrated by a bore hole containing a conductive casing comprising traversing the interior of the casing by means of a pair of electrodes having a fixed spacing, lengthwise of the casing, between them while providing current flow through said electrodes and lengthwise through the casing between the electrodes, and simultaneously measuring the potential between said casing and a remote ground.

JOHN M. PEARSON.

REFERENCES CITED

The following references are of record in the file of this patent:

UNITED STATES PATENTS

| Number | Name | Date |
|---|---|---|
| 1,826,961 | Slichter | Oct. 13, 1931 |
| 2,297,754 | Ennis | Oct. 6, 1942 |
| 2,317,259 | Doll | Apr. 20, 1943 |
| 2,371,658 | Stewart | Mar. 20, 1945 |
| 2,397,254 | Ennis | Mar. 26, 1946 |
| 2,397,255 | Ennis | Mar. 26, 1946 |
| 2,414,194 | Ennis | Jan. 14, 1947 |
| 2,459,196 | Stewart | Jan. 18, 1949 |

OTHER REFERENCES

Geophysical Exploration, Heiland, pgs. 825–827, pub. 1940 by Prentice-Hall, N. Y. C.